US008526137B2

(12) United States Patent
Biskeborn et al.

(10) Patent No.: US 8,526,137 B2
(45) Date of Patent: Sep. 3, 2013

(54) HEAD COMPRISING A CRYSTALLINE ALUMINA LAYER

(75) Inventors: Robert G. Biskeborn, Hollister, CA (US); Cherngye Hwang, San Jose, CA (US); Calvin S. Lo, Saratoga, CA (US); Andrew C. Ting, El Prado, NM (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 12/761,394

(22) Filed: Apr. 16, 2010

(65) Prior Publication Data

US 2011/0256423 A1    Oct. 20, 2011

(51) Int. Cl.
*G11B 5/187*    (2006.01)

(52) U.S. Cl.
USPC ............ 360/110; 360/122; 428/813; 428/814

(58) Field of Classification Search
USPC ......... 360/122, 317, 110, 320, 128; 428/813, 428/814, 815
See application file for complete search history.

(56) References Cited

U.S. PATENT DOCUMENTS

| | | | |
|---|---|---|---|
| 3,791,852 A | | 2/1974 | Bunshah |
| 4,512,862 A | | 4/1985 | Rigby |
| 5,055,319 A | | 10/1991 | Bunshah et al. |
| 5,156,704 A | * | 10/1992 | Kemp ............................. 216/52 |
| 5,537,278 A | * | 7/1996 | Yaegashi et al. ............ 360/119.1 |
| 5,789,071 A | | 8/1998 | Sproul et al. |
| 5,850,323 A | * | 12/1998 | Kanai ....................... 360/324.11 |
| 6,313,973 B1 | * | 11/2001 | Fuke et al. .................. 360/324.1 |
| 6,638,857 B1 | | 10/2003 | Chakrabarti |
| 7,041,391 B2 | | 5/2006 | Ando et al. |
| 7,235,310 B2 | | 6/2007 | Chang et al. |
| 8,173,563 B2 | * | 5/2012 | Sugiura et al. ................. 501/127 |
| 2002/0054459 A1 | | 5/2002 | Ishihara et al. |
| 2007/0153421 A1 | * | 7/2007 | Sugiura et al. ............. 360/235.3 |
| 2008/0266725 A1 | * | 10/2008 | Shatz et al. ............... 360/324.11 |
| 2009/0214894 A1 | * | 8/2009 | Kohara et al. .................. 428/702 |
| 2010/0143749 A1 | * | 6/2010 | Mori et al. ..................... 428/813 |
| 2010/0315743 A1 | | 12/2010 | Wang et al. |

FOREIGN PATENT DOCUMENTS

| | | |
|---|---|---|
| EP | 2002/312910 | 10/2002 |
| EP | 2009/110571 | 5/2009 |

OTHER PUBLICATIONS

International Search Report and Written Opinion from PCT Application No. PCT/EP2011/052987 dated May 13, 2011.

* cited by examiner

*Primary Examiner* — Jefferson Evans
(74) *Attorney, Agent, or Firm* — Zilka-Kotab, PC

(57) ABSTRACT

A magnetic head produced at low ambient temperatures that comprise a crystalline alumina layer for increasing the durability of the head is provided. According to one embodiment, a magnetic head for at least one of reading and writing data on to a magnetic data storage media. The magnetic head comprises a substrate, an at least partially crystalline alumina layer formed on the substrate, at least one of a write transducer and a read transducer formed on the substrate, and a surface for engaging the magnetic data storage media. In another embodiment, a method for forming an at least partially crystalline alumina film. The method comprises providing a substrate, and depositing alumina onto the substrate at an ambient temperature to form the at least partially crystalline alumina film.

23 Claims, 4 Drawing Sheets

HEAD COMPRISING A CRYSTALLINE ALUMINA LAYER

BACKGROUND OF THE INVENTION

1. Field of the Invention

The present invention relates generally to crystalline structures of aluminum oxide and particularly to producing magnetic heads at low ambient temperatures that comprise a crystalline alumina layer for increasing the reliability of the heads.

2. Background Information

Some devices, such as some magnetic tape heads, incorporate thin aluminum oxide films and layers to provide enhanced hardness and increase the durability of the head. It is known that thin aluminum oxide, also commonly referred to as alumina, or by its chemical formula $Al_2O_3$, provides a higher hardness and enhanced durability compared to conventional sputtered films. However, such magnetic heads may require low temperature processes for fabricating the head to prevent damage to the devices of the head, such as read transducers and write transducers.

It is generally accepted that only amorphous $Al_2O_3$ can be formed at low temperatures, such as ambient or room temperature, using conventional means, such as physical vapor deposition (PVD) or ion beam sputter deposition (IBSD) among other known means.

Known methods used for producing hard alumina generally require temperatures that exceed normal head processing temperatures. Thus, producing hard alumina films and layers in a magnetic head using known methods could damage the devices of the head, such as read transducers and write transducers. There are no known means for producing hard alumina films at temperatures acceptable for magnetic head processing, where the maximum temperature can be as low as about 60° C. to about 70° C.

Therefore, it would be beneficial to the manufacture of magnetic heads to have an aluminum oxide film and/or layer which could be processed at lower temperatures consistent with the requirements of modern magnetic heads and that would provide a head with enhanced hardness, improved corrosion resistance, and increased reliability.

SUMMARY OF THE INVENTION

According to one general embodiment, a magnetic head for at least one of reading and writing data on to a magnetic data storage media. The magnetic head comprises a substrate, an at least partially crystalline alumina layer formed on the substrate, at least one of a write transducer and a read transducer formed on the substrate, and a surface for engaging the magnetic data storage media.

According to another general embodiment, a magnetic head for at least one of reading and writing data on to a magnetic data storage media. The magnetic head comprises a substrate, at least one of a write transducer and a read transducer formed on the substrate, a bearing surface for engaging the data storage media, and an at least partially crystalline alumina film formed on at least a portion of the bearing surface at room temperature.

According to another general embodiment, a head for at least one of reading and writing data on to a magnetic data storage media. The head comprises a substrate, a transducer film formed on at least a portion of the substrate, the transducer film comprising at least one of a write transducer and a read transducer, a media bearing surface formed over at least a portion of the transducer film, and an at least partially crystalline alumina layer formed over at least a portion of the media bearing surface.

In still another general embodiment, a method for forming an at least partially crystalline alumina film. The method comprises providing a substrate, and depositing alumina onto the substrate at an ambient temperature to form the at least partially crystalline alumina film.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

Figure 1:
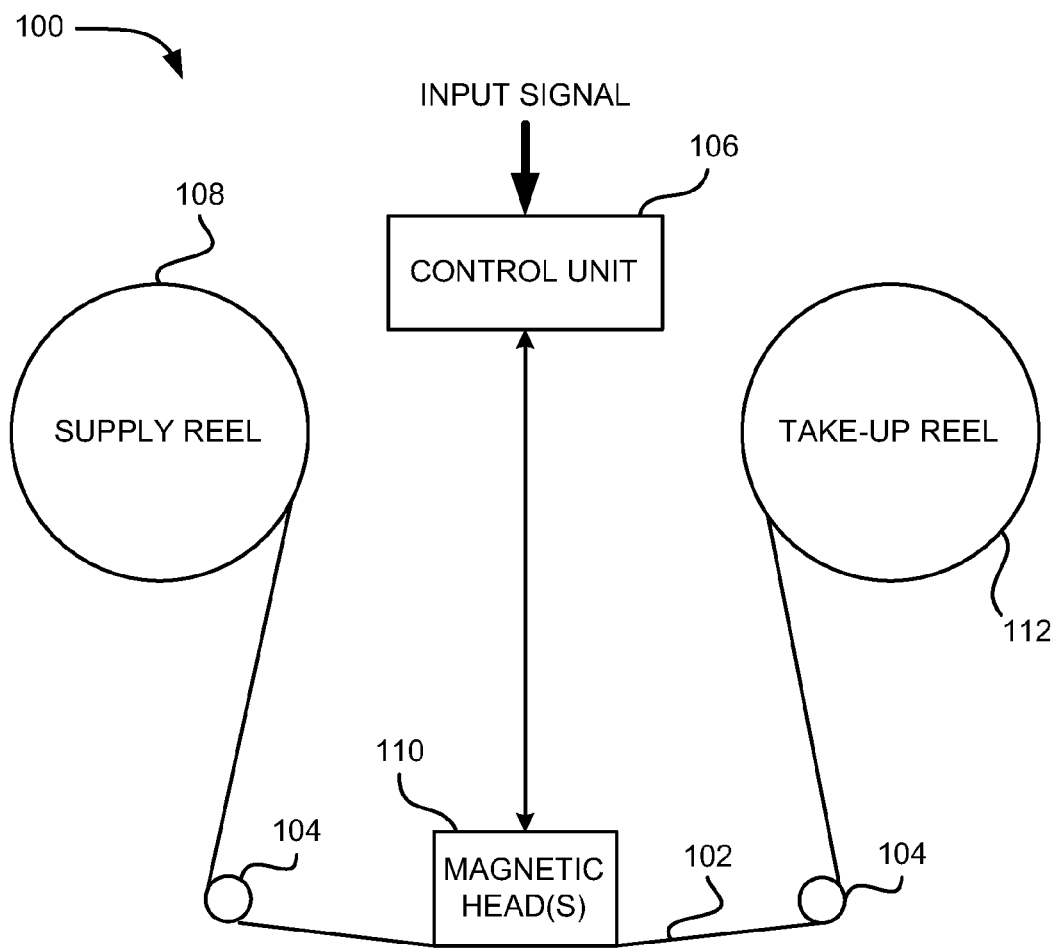
FIG. 1 is a simplified tape drive system, according to one embodiment.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of fabricating magnetic heads and preferred embodiments of systems for fabricating magnetic heads. While the following description will be described in terms of embodiments of fabricating magnetic heads and embodiments of systems for fabricating magnetic heads for clarity and to place the invention in context, it should be kept in mind that the teachings herein may have broad application to all types of magnetic heads and systems for fabricating magnetic heads as well as magnetic data recording and data storage.

The embodiments described below disclose magnetic heads produced at low ambient temperatures that comprise a crystalline alumina layer for increasing the durability of the heads. According to one general embodiment, a method for forming a crystalline alumina film includes etching a substrate and depositing alumina onto the substrate at an ambient temperature of less than about 50° C. to form a crystalline alumina film.

In one general embodiment, a magnetic head for at least one of reading and writing data on to a magnetic data storage media. The magnetic head comprises a substrate, an at least partially crystalline alumina layer formed on the substrate, at least one of a write transducer and a read transducer formed on the substrate, and a surface for engaging the magnetic data storage media.

According to another general embodiment, a magnetic head for at least one of reading and writing data on to a magnetic data storage media. The magnetic head comprises a substrate, at least one of a write transducer and a read transducer formed on the substrate, a bearing surface for engaging the data storage media, and an at least partially crystalline alumina film formed on at least a portion of the bearing surface at room temperature.

According to another general embodiment, a head for at least one of reading and writing data on to a magnetic data storage media. The head comprises a substrate, a transducer film formed on at least a portion of the substrate, the transducer film comprising at least one of a write transducer and a read transducer, a media bearing surface formed over at least a portion of the transducer film, and an at least partially crystalline alumina layer formed over at least a portion of the media bearing surface.

In still another general embodiment, a method for forming an at least partially crystalline alumina film. The method comprises providing a substrate, and depositing alumina onto the substrate at an ambient temperature to form the at least partially crystalline alumina film.

FIG. 1 shows an illustrative tape drive system 100, according to one embodiment. The tape drive system 100 may be used with any of the other embodiments described herein, including the methods of producing a crystalline film of alumina at lower temperatures.

Referring to FIG. 1, the tape drive system 100 includes a magnetic tape 102 which is fed from a supply reel 108, past one of more rollers 104, across one or more magnetic heads 110, and then onto a take-up reel 112. Of course, the magnetic tape 102 may be advanced or rewound from/to either the supply reel or the take-up reel as necessary to read and/or write data to/from the magnetic tape 102. The magnetic head(s) 110 perform writing and/or reading data to/from the magnetic tape 102. The tape drive system 100 may be coupled to a host computer (not shown) or some other device that can supply an input signal to the tape drive system 100.

The control unit 106 provides overhead control functionality for the operations of the tape drive system 100. When writing and data to the magnetic tape 102, the control unit 106 communicates with the host for receiving data for subsequent writing.

The tape drive system 100 includes one or more write and/or read heads 110. The tape drive system 100 also includes drive motor components (not shown) for performing forward and reverse movement of the tape 102 which is mounted on the supply reel 108 and the take-up reel 112. The drive components of the tape drive system 100 are controlled by a motion control system (not shown) and the motor driver circuit (not shown), for moving the tape 102 transversely across a tape bearing surface of the magnetic heads 110 when writing and/or reading data to/from the magnetic tape 102.

Figure 2A:
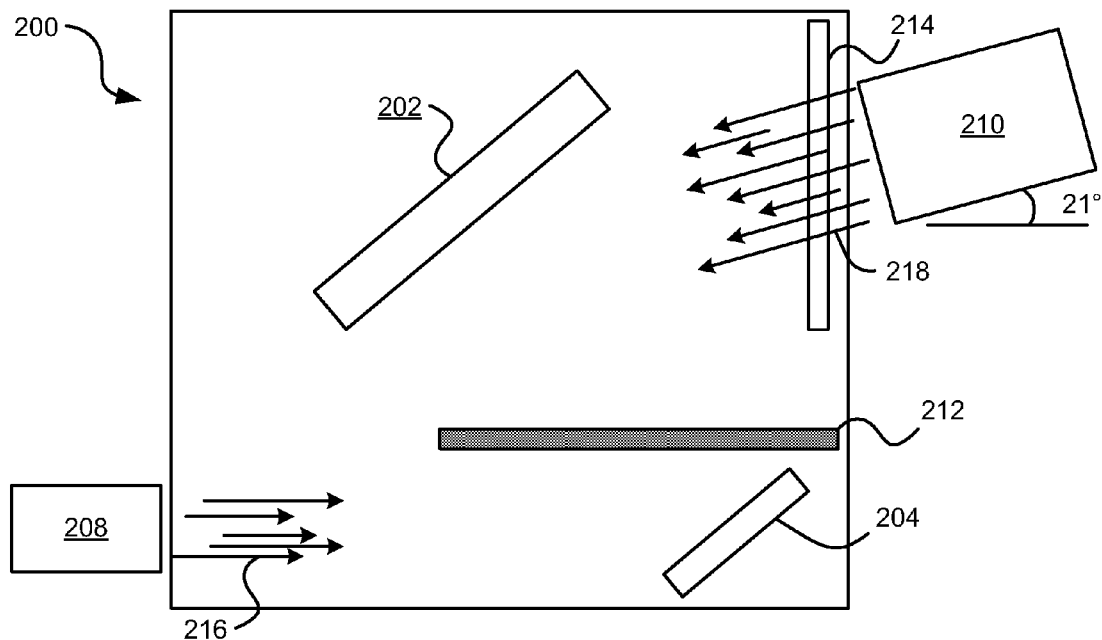
FIG. 2A is a simplified view of a chamber, according to one embodiment, which can be used in conjunction with methods described herein.

Now referring to FIG. 2A, a chamber 200 which may be used in conjunction with the methods described herein is described. The chamber 200 includes a target 204, a target shutter 212, a first ion source 210, an etch shutter 214, a second ion source 208, and a fixture 202. The etch shutter 214 is shown in an "open" condition, while the target shutter 212 is shown in a "closed" condition.

As shown in FIG. 2A, the first ion source 210, which may also be referred to as an "etch source," may be rotated by an angle from horizontal. In this particular case, the angle is 21°. However, any desired angle may be used, and the angle affects the positioning of other components of the chamber 200. Therefore, the other angles shown are based on the 21° at which the first ion source 210 is tilted. The first ion source 210 produces first ions 218 which, when the etch shutter 214 is at least partially open, can contact a surface being secured by the fixture 202. In some embodiments, the first ion source 210 may be a 350 mm ion source. In even more embodiments, the first ions 218 may be argon ions.

The second ion source 208, sometimes referred to in the art as a deposition source or "depo" source, produces a reactive ion beam 216, which contacts the target 204. In some embodiments, the target 204 may comprise aluminum. If the target shutter 212 is at least partially open, the resulting ions will contact a surface being secured by the fixture 202. In some embodiments, the second ion source 208 may be a 210 mm ion source, but is not so limited.

The fixture 202 is used as the base which secures the surface from which processing is to occur. For example, if a substrate (shown in FIG. 2B) is to be etched, the fixture 202 will secure a substrate with the desired surface to be etched facing the first ion source 210 for etching thereof. The fixture 202 may be freely rotated and controlled precisely, such that the angle of impact on the surface can be set and maintained.

According to one embodiment, a method for forming magnetic head that includes a crystalline alumina film includes etching a substrate and depositing alumina onto the substrate at an ambient temperature of less than about 50° C. to form a crystalline alumina film.

Figure 2B:
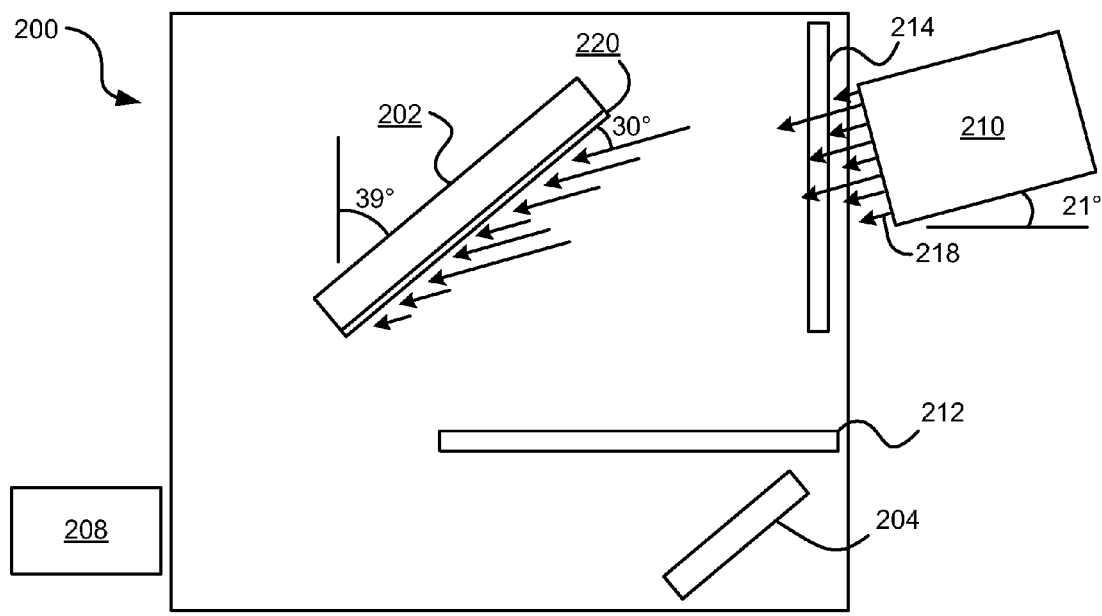
FIG. 2B is a simplified view of the chamber, according to one embodiment, which is set up for a 60° etch process.

Now referring to FIG. 2B, a preferred etching process for substrate 220 is shown. According to one general embodiment, etching may comprise ion milling the substrate 220 at an angle of about 60° relative to normal to a surface of the substrate 220. However, any angle suitable for ion milling the substrate 220 may be used, such as 55°, 65°, 75°, 45°, etc. However, good results have been observed at an angle of 60°. In some embodiments, ion milling may be performed using an argon ion beam or other ion beam. The argon ion beam, or other ion beam, may be provided by a device, such as the first ion source 210, operating at about 300V and about 300 mA.

In one embodiment, the substrate 220 may comprise crystalline $Al_2O_3$, NiFe, AlTiC, or other known suitable substrate material. In one preferred embodiment, the substrate 220 comprises crystalline $Al_2O_3$, or some other form of alumina, with the formula $Al_xO_y$, where x ranges from 1 to 6, and y ranges from 1 to 10, whether crystalline or amorphous.

Figure 2C:
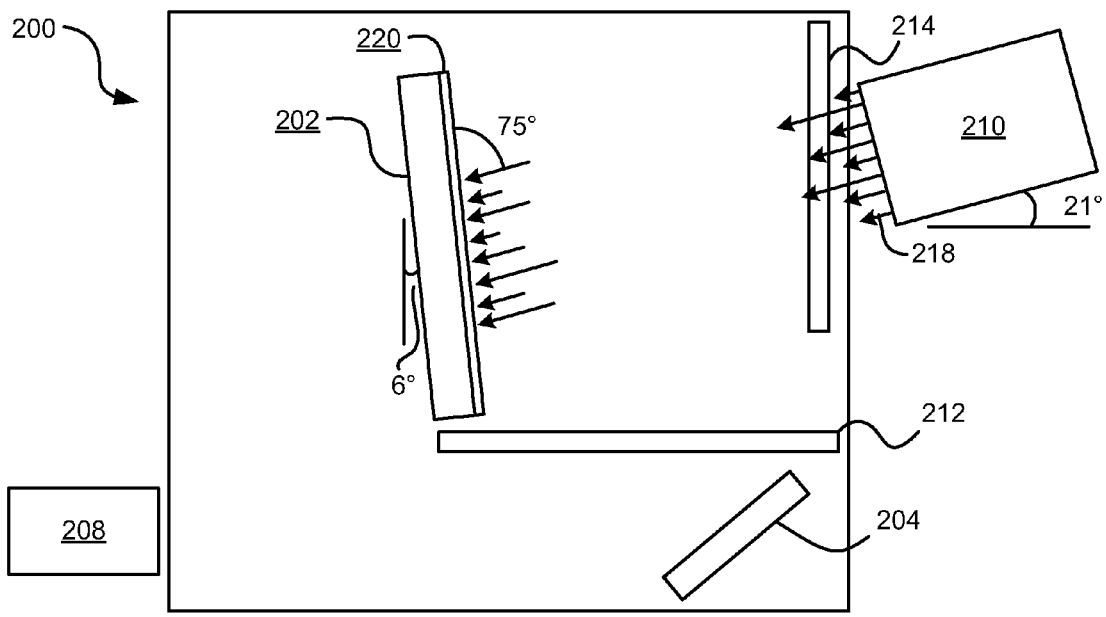
FIG. 2C is a simplified view of the chamber, according to one embodiment, which is set up for a 15° etch process.

In one general embodiment, the substrate 220 may be etched until about 2 nm or more of an upper layer of the substrate 220 has been removed. In one preferred embodiment, etching may occur until about 1-2 nm of an upper layer of the substrate 220 has been removed. As shown in FIG. 2C, an example of etching at angle is shown, to demonstrate the movement of the fixture 202 relative to the first ion source 210. In FIG. 2C, ion milling is preferably performed at an angle ranging from more than 5° to less than 40° relative to normal to a surface of the substrate 220. In one preferred embodiment, ion milling is performed at of about 15° relative to normal to a surface of the substrate 220.

Figure 2D:
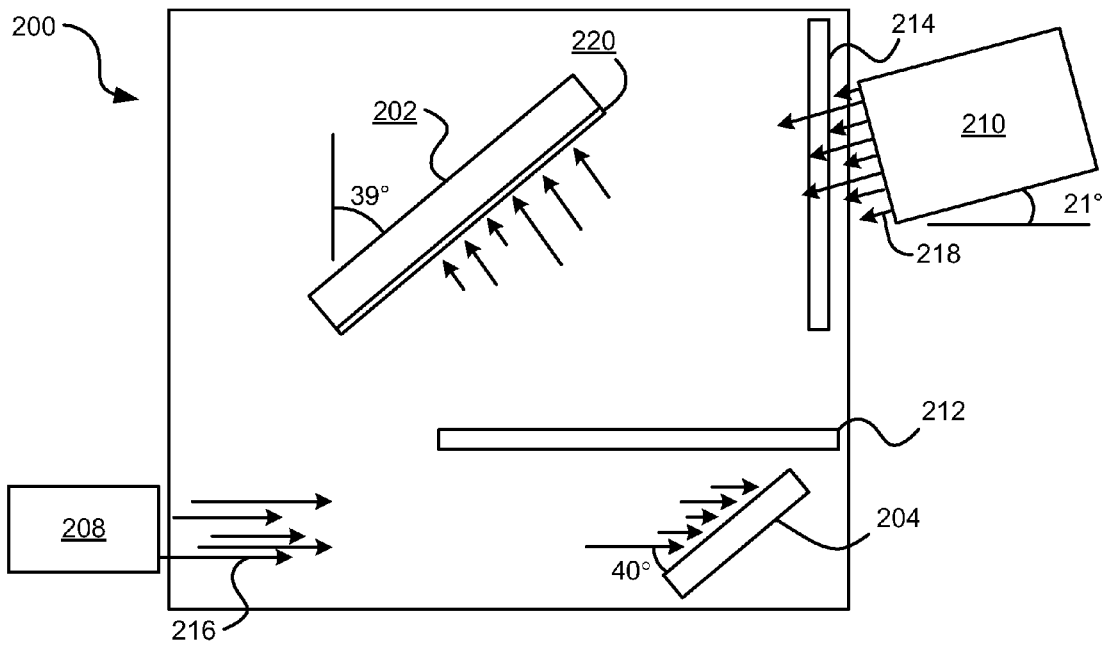
FIG. 2D is a simplified view of the chamber, according to one embodiment, which is set up for deposition with an incident angle on the target of 40°.

Now referring to FIG. 2D, a deposition process is shown according to one preferred embodiment. The deposition process may comprise reactive ion beam sputtering from an aluminum target 204 at an angle of about 40° relative to a surface of the target 204. In some embodiments, the reactive ion beam 216 may be provided via a device, such as the second ion source 208, operating at about 900V and about 375 mA. In addition, the deposition may occur via reactive ion beam sputtering from an aluminum target 204 in the presence of an oxygen ion beam tilted at an angle of about 60° relative to normal to the surface of the substrate 220. Other angles may be used and good results have been obtained at an angle of about 60°. In some embodiments, the oxygen ion beam is provided via a device operating at about 100V and about 120 mA. In other embodiments, the deposition occurs in the presence of oxygen.

In one general preferred embodiment, the deposition of alumina onto the etched substrate 220 may occur at an ambient temperature of less than about 30° C. to form an at least partially crystalline alumina layer or film 222. The at least partially crystalline alumina film 222, partially crystalline alumina film 222, hereinafter for sake of clarity only, may be deposited onto the substrate 220 to a thickness ranging from about 10 nm to about 70 nm.

Figure 3A:
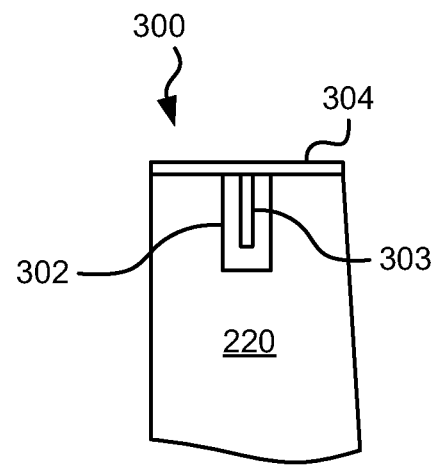
FIG. 3A is a side view of one embodiment of a system.
Figure 3B:
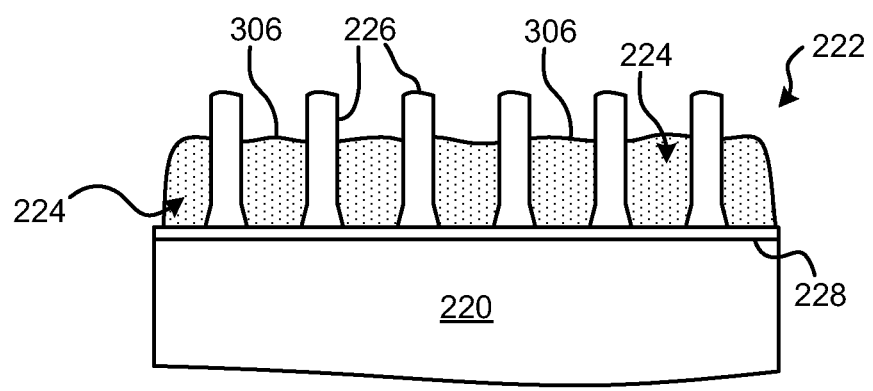
FIG. 3B is a side view of a magnetic head according to another embodiment.

Referring to FIG. 3B, in one embodiment, the partially crystalline alumina film 222 deposited onto the substrate 220 comprises a crystalline $Al_2O_3$ 224 portion and an amorphous $Al_2O_3$ 226 portion. The crystalline $Al_2O_3$ 224 portion of the film 222 exhibits substantially more wear resistance than the amorphous $Al_2O_3$ 226 portion of the film 222.

The partially crystalline aluminum oxide film 222 disclosed herein may be grown at low pressures and near room temperature on a substrate comprising polycrystalline aluminum oxide. Of particular interest is the technique for growing crystalline $Al_2O_3$ grains comprising crystalline $Al_2O_3$ 224 portion of the film 222.

One important factor to form the crystalline $Al_2O_3$ 224 is the surface condition of the substrate 220. It has been discovered through experimentation that prior to deposition, in order to achieve the desired crystalline $Al_2O_3$ grains, the surface should be ion milled at an angle of about 60° for a period sufficient to remove at least a few nanometers of substrate base material. Upon deposition, the substrate 220 is annealed to form the partially crystalline aluminum oxide film 222.

It has also been found that a crystalline $Al_2O_3$ substrate having grains with certain preferred orientations will promote such a crystalline film growth. In addition, using a reactive ion beam sputtering from an Al metal target and combining with an oxygen ion source, $Al_2O_3$ with a high percentage of crystalline structure can be formed.

It has also been found that the crystalline $Al_2O_3$ structure forms on iron containing substrates. For example, the crystalline $Al_2O_3$ structure may form on a substrate 220 comprising Sendust or permalloy. Additionally, an iron containing film 228, shown in FIG. 3B, may be formed on the substrate 220 to achieve the crystalline $Al_2O_3$ structure when alumina is deposited onto the NiFe containing film 228. In one embodiment, the NiFe containing film 228 may be etched using known means, and the etch condition may a strong influence on growth of the crystalline $Al_2O_3$ 224 portion of the film 222. This is known to enhance the wear performance of magnetic sensors containing NiFe films.

An exemplary procedure for growing an at least partially crystalline $Al_2O_3$ film at room temperature, using an ion beam sputter deposition (IBSD) system is described below.

The deposition beam (900V, 375 mA) may sputter an Al metal target at an angle of about 40°. The oxygen beam (100V, 120 mA) may be tilted at an angle of about 60° relative to normal to the substrate surface. The substrate etch may include an Ar ion beam (300V, 300 mA) etching at an angle of 60° relative to normal to the substrate surface.

For reference, 15° is an exemplary milling angle for amorphous growth of aluminum oxide. Typically, a portion of the film grown on the $Al_2O_3$ grains exhibits the crystalline structure. Only certain $Al_2O_3$ crystalline planes in the grains promote epitaxial growth. Cross section TEM images have shown crystalline growth on one grain and amorphous growth on a neighboring grain. Lapping rates indicate that the crystalline structure is much more resistant to wear, almost approaching the $Al_2O_3$ grains in the substrate.

Now referring to FIG. 3A, in some embodiments, a system 300 for reading and/or writing data includes a magnetic head 302. The magnetic head 302 is configured for recording and/or writing data and includes reading and/or writing transducers 303. A crystalline $Al_2O_3$ bearing surface 304 may be formed over the head 302, including reading and/or writing transducers 303, to provide a wear resistant layer for protecting the head 302 from wear and corrosion to improve reliability of the head 302. In one embodiment, the crystalline $Al_2O_3$ bearing surface 304 may comprise at least one partially crystalline alumina film 222 and may be formed as discussed previously.

Referring to FIG. 3B, in some more approaches, the partially crystalline alumina film 222 may provide a lapping barrier 306 located above the substrate 220. As noted above, the partially crystalline alumina film 222 comprises a crystalline $Al_2O_3$ 224 portion and an amorphous $Al_2O_3$ 226 portion and the crystalline $Al_2O_3$ 224 portion of the film 222 exhibits substantially more wear resistance than the amorphous $Al_2O_3$ 226 portion of the film 222. Thus, the crystalline $Al_2O_3$ 224 portion of the film 222 may provide a lapping barrier 306 for different, known lapping processes. In one embodiment, an alumina lapping process is used to lap the partially crystalline alumina film 222. The alumina lapping process may comprise a selected one of an alumina pad lapping process and an alumina slurry lapping process, as is known in the art. Using with of these two alumina lapping processes, the crystalline $Al_2O_3$ 224 portion of the film 222, provides a lapping barrier 306 that is about 70 percent to 80 percent of the thickness that the film 222 was deposited on the substrate 220.

The remaining 20 nm or so in a 50 nm coating of the partially crystalline alumina film 222 is very resistant to $Al_2O_3$ pad lapping, sometimes referred to as "kiss lapping" and thus acts as a very good lapping stop, with a wear rate ratio of more than about 100:1.

Another device that may incorporate this uniquely grown $Al_2O_3$ is a crystalline undercoat insulation layer for tape magnetic recording heads. Such a layer is significantly more resistant to wear than a conventional amorphous alumina that is generally used in conventional devices. In addition, material systems, such as nitrides of titanium and/or zirconium, may be candidates for use with embodiments described herein. Furthermore, the crystalline $Al_2O_3$ structure forms on etched NiFe films, in which the etch condition has a strong influence on such a growth. This is known to enhance the wear performance of magnetic sensors containing NiFe films.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A magnetic head for at least one of reading and writing data on to a magnetic data storage media, the magnetic head comprising:

a substrate comprising a crystalline and/or polycrystalline material;

an at least partially crystalline alumina layer formed directly on the substrate; and at least one of a write transducer and a read transducer formed on the substrate, wherein the substrate comprises a selected one of alumina, crystalline $Al_2O_3$, and AlTiC.

2. The magnetic head of claim 1, wherein the substrate comprises at least partially crystalline $Al_2O_3$, and wherein the at least partially crystalline alumina layer is formed on the substrate by depositing alumina onto the substrate to form the at least partially crystalline alumina layer.

3. The magnetic head of claim 1, wherein a surface of the substrate on which the at least partially crystalline alumina layer is positioned has physical characteristics of being etched prior to formation of the at least partially crystalline alumina layer thereon.

4. The magnetic head of claim 3, wherein the physical characteristics of the substrate are characteristic of resulting from etching the substrate at an angle of more than 50° and less than 70° relative to normal to the surface of the substrate.

5. The magnetic head of claim 1, wherein the at least partially crystalline alumina layer comprises $Al_2O_3$ and exhibits more wear resistance than an amorphous $Al_2O_3$ film having a thickness equal to a thickness of the at least partially crystalline alumina film.

6. A method for forming the at least partially crystalline alumina film as recited in claim 1, the method comprising:
providing the substrate; and
depositing alumina onto the substrate at an ambient temperature to form the at least partially crystalline alumina film.

7. The method of claim 6,
wherein the substrate comprises at least partially crystalline $Al_2O_3$, and
the at least partially crystalline alumina layer is formed on the substrate by depositing alumina onto the substrate.

8. The method of claim 6,
wherein the substrate comprises iron; and
the at least partially crystalline alumina layer is formed on the substrate by depositing alumina onto the substrate.

9. The method of claim 6, further comprising:
forming an iron containing film on the substrate; and
wherein the at least partially crystalline alumina layer is formed on the substrate by ion milling at least a portion of an upper layer of the iron containing film at least one milling angle and ion milling at least a portion of the iron containing film at a final milling angle ranging from about 10° to about 30° relative to normal to the substrate and then depositing a layer of alumina.

10. The method of claim 9, wherein the final milling angle is about 15° relative to normal to the substrate.

11. A magnetic head for at least one of reading and writing data on to a magnetic data storage media, the magnetic head comprising:
a substrate comprising a crystalline and/or polycrystalline material;
an at least partially crystalline alumina layer formed directly on the substrate;
at least one of a write transducer and a read transducer formed on the substrate; and
an at least partially crystalline alumina layer formed on a surface of the head that is adapted for facing the magnetic data storage media, the at least partially crystalline alumina layer having a bearing surface for engaging the magnetic data storage media.

12. The magnetic head of claim 11, wherein the at least partially crystalline alumina film has a thickness ranging from about 10 nm to about 70 nm.

13. The magnetic head of claim 11, wherein a surface of the substrate on which the at least partially crystalline alumina layer is positioned has physical characteristics of being etched prior to formation of the at least partially crystalline alumina layer thereon.

14. The magnetic head of claim 11, wherein the at least partially crystalline alumina layer comprises $Al_2O_3$ and exhibits more wear resistance than an amorphous $Al_2O_3$ film having a thickness equal to a thickness of the at least partially crystalline alumina film.

15. A method for forming the at least partially crystalline alumina film as recited in claim 11, the method comprising:
providing the substrate; and
depositing alumina onto the substrate at an ambient temperature to form the at least partially crystalline alumina film.

16. A magnetic head for at least one of reading and writing data on to a magnetic data storage media, the magnetic head comprising:
a substrate;
at least one of a write transducer and a read transducer formed on the substrate;
a surface for facing the data storage media; and
an at least partially crystalline alumina film formed over at least a portion of the surface,
the surface having physical characteristics of having been ion milled at an angle ranging from about 50° to about 70° relative to normal to the surface.

17. The magnetic head of claim 16, wherein the surface has physical characteristics of having been ion milled at an angle of about 60° relative to normal to the bearing surface until a portion of an upper layer of the surface has been removed.

18. The magnetic head of claim 16, wherein the at least partially crystalline alumina film has physical characteristics of having been formed on the bearing surface by sputtering from an alumina target.

19. The magnetic head of claim 16, wherein the at least partially crystalline alumina film has physical characteristics of having been formed on the bearing surface by sputtering from an aluminum target in the presence of oxygen.

20. A magnetic head for at least one of reading and writing data on to a magnetic data storage media, the magnetic head comprising:
a substrate;
at least one of a write transducer and a read transducer formed on the substrate;
a surface for facing the data storage media; and
an at least partially crystalline alumina film formed over at least a portion of the surface,
wherein the at least partially crystalline alumina film has a thickness ranging from about 10 nm to about 70 nm.

21. The magnetic head of claim 20, wherein the at least partially crystalline alumina film has physical characteristics of having been lapped to a predetermined thickness using a lapping process comprising one of a diamond slurry lapping process and an alumina lapping process.

22. The magnetic head of claim 21, wherein the alumina lapping process comprises one of an alumina pad lapping process and an alumina slurry lapping process.

23. The magnetic head of claim 22, wherein the crystalline alumina of the at least partially crystalline alumina film formed on the bearing surface provides a lapping barrier that ranges from about 70 percent to about 80 percent of the thickness of the at least partially crystalline alumina film formed on the bearing surface.

* * * * *